(12) United States Patent
Schoch et al.

(10) Patent No.: US 11,092,807 B2
(45) Date of Patent: Aug. 17, 2021

(54) DISPLAY DEVICE, DRIVER ASSISTANCE SYSTEM AND METHOD FOR A MOTOR VEHICLE, AND ALSO MOTOR VEHICLE

(71) Applicant: VALEO Schalter und Sensoren GmbH, Bietigheim-Bissingen (DE)

(72) Inventors: Lars Schoch, Bietigheim-Bissingen (DE); Karl Simonis, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 245 days.

(21) Appl. No.: 16/305,554

(22) PCT Filed: May 17, 2017

(86) PCT No.: PCT/EP2017/061824
§ 371 (c)(1),
(2) Date: Nov. 29, 2018

(87) PCT Pub. No.: WO2017/207275
PCT Pub. Date: Dec. 7, 2017

(65) Prior Publication Data
US 2020/0326541 A1    Oct. 15, 2020

(30) Foreign Application Priority Data
May 30, 2016    (DE) .......................... 102016109872.8

(51) Int. Cl.
*G02B 27/01*    (2006.01)
*B60K 35/00*    (2006.01)

(52) U.S. Cl.
CPC .......... *G02B 27/0149* (2013.01); *B60K 35/00* (2013.01); *G02B 27/0101* (2013.01);
(Continued)

(58) Field of Classification Search
CPC ........ G02B 27/0101; G02B 2027/0154; G02B 27/0149; G02B 26/101; G02B 27/01;
(Continued)

(56) References Cited

U.S. PATENT DOCUMENTS 5,394,203 A * 2/1995 Murphy ................. G02B 27/01
353/13
2002/0167189 A1    11/2002 Nakamura et al.
(Continued)

FOREIGN PATENT DOCUMENTS

CN    1685150 A    10/2005
CN    103080543 A    5/2013
(Continued)

OTHER PUBLICATIONS

International Search Report with English Translation and Written Opinion Issued in Corresponding PCT Application No. PCT/EP2017/061824, dated Aug. 2, 2017 (10 Pages with English Translation of International Search Report).
(Continued)

*Primary Examiner* — Brandi N Thomas
(74) *Attorney, Agent, or Firm* — Osha Bergman Watanabe & Burton LLP

(57) ABSTRACT

The invention relates to a display device (2) for a motor vehicle (1) having a housing, which comprises a projection device (3) arranged in the housing for generating a virtual image (10) on a projection surface which is located outside the housing and observable by an observer, which projection device comprises at least one mirror (6) mounted such that it is pivotable about an axis of rotation (11), which mirror is designed to deflect light (4) output by a light source of the projection device (3) in a deflection position, and having an adjustment device for adjusting the deflection position of the mirror (6) by pivoting about the axis of rotation (11),
(Continued)

wherein the adjustment device comprises at least one first shape-memory wire (17), which is coupled to the mirror (6), and therefore the mirror (6) is pivotable about the axis of rotation (11) by a length change of the first shape-memory wire (17). Furthermore, the invention relates to a driver assistance system, a motor vehicle (1) and a method.

14 Claims, 3 Drawing Sheets

(52) U.S. Cl.
CPC .. *B60K 2370/1529* (2019.05); *B60K 2370/23* (2019.05); *B60K 2370/29* (2019.05); *G02B 2027/0159* (2013.01)

(58) Field of Classification Search
CPC .......... G02B 27/0179; G02B 2027/014; G02B 2027/0181; G02B 2027/0159; G02B 2027/0145; G02B 26/10; G02B 26/0833; G02B 30/26; G02B 2027/011; G02B 2027/0183; G02B 2027/0187; G02B 2027/0198; G02B 27/0983; G02B 27/18; G02B 2027/0112
USPC .................................................. 359/619–633
See application file for complete search history.

(56) References Cited

U.S. PATENT DOCUMENTS

| | | |
|---|---|---|
| 2004/0252936 A1 | 12/2004 | Despont et al. |
| 2008/0082232 A1 | 4/2008 | Repetto et al. |
| 2013/0145760 A1 | 6/2013 | Gonda |
| 2015/0092278 A1 | 4/2015 | Haida et al. |
| 2017/0028923 A1* | 2/2017 | Wieczorek .............. G06F 3/017 |

FOREIGN PATENT DOCUMENTS

| | | |
|---|---|---|
| DE | 102012018397 A1 | 3/2013 |
| DE | 102014008201 A1 | 12/2015 |
| DE | 102015203787 A1 | 9/2016 |
| EP | 1912091 A1 | 4/2008 |
| EP | 3032318 A1 | 6/2016 |
| FR | 3021417 A1 | 11/2015 |
| WO | 2015180817 A1 | 12/2015 |

OTHER PUBLICATIONS

Search Report Issued in Corresponding German Application No. 102016109872.8, dated Jan. 11, 2018 (5 Pages).
The First Office Action issued in corresponding Chinese Appication No. 201780042772.3, dated Jul. 6, 2020 (12 pages).

* cited by examiner

DISPLAY DEVICE, DRIVER ASSISTANCE SYSTEM AND METHOD FOR A MOTOR VEHICLE, AND ALSO MOTOR VEHICLE

The present invention relates to a display device for a motor vehicle having a housing which comprises a projection device arranged in the housing for generating a virtual image on a projection surface which is located outside the housing and is observable by an observer, which projection device comprises at least one mirror mounted such that it is pivotable about an axis of rotation, which mirror is designed to deflect light output by a light source of the projection device in a deflection position, and having an adjustment device for adjusting the deflection position of the mirror by pivoting about the axis of rotation. In addition, the present invention relates to a driver assistance system having such a display device. Furthermore, the present invention relates to a motor vehicle having such a driver assistance system having such a display device. Finally, the present invention relates to a method for adjusting a mirror of a display device of a motor vehicle.

Display devices for motor vehicles are already known from the prior art, using which a display can be provided to the driver and/or the passengers of the motor vehicle. Interest is directed in the present case in particular to head-up display devices, which are also referred to as head-up displays (HUD). Such a display device typically comprises a housing, in which a projection device is arranged. Furthermore, the display device comprises an optical device, which can comprise, for example, one or more mirrors. The light output by the projection device can be projected onto a projection surface using the optical device. The projection surface is arranged such that it is observable by an observer, in particular a driver of the motor vehicle. The projection surface can comprise a semi-transparent mirrored surface. This semi-transparent mirrored surface can be provided, for example, by a region of the windscreen of the motor vehicle. The optical device can comprise at least one mirror mounted such that it is pivotable about an axis of rotation. The mirror mounted such that it is rotatable is used in particular for deflecting light output by the projection device. The information projected on the display element, in particular the windscreen, which is reflected thereby, is overlaid with information shining through the display element from surroundings located behind the display element, whereby a virtual image or a virtual display can be provided. To enable an optimum view of the virtual image for the driver depending on the seat position and/or depending on the height of the driver, an eyebox can be tracked in the vehicle. The eyebox is the region or field of vision in which the viewpoint of the user is located, i.e., the region in which the user can see the displayed information. The deflection of the output light by the projection device is used to track the eyebox and is implemented by means of an adjustment device on the mirror.

The position of the display device is typically arranged in front of the observer, in particular in front of the driver of the motor vehicle, in a passenger compartment of the motor vehicle. An installation space in the region of the dashboard, in particular in the region of an instrument cluster shroud, can be provided, in which the display device can be installed and can be protected by means of a cover, which is preferably transparent, from dirt particles.

A displacement range of the eyebox is typically very small, since a large change of the look-down angle also results in a large shift of the virtual image. The look-down angle is the angle between the horizontal and a marked image and/or the angle of the road surface which results from a viewpoint of the observer. In the event of a change in the look-down angle, a location of the virtual image is thus changed, so that a displayed item of information is changed in the virtual display, and therefore, for example in the case of the depiction of a navigation arrow, the latter is no longer is located on the road from the view of the observer. Furthermore, the virtual image cannot extend excessively far into a middle field of vision of the driver, since otherwise the virtual image could mask out possible obstructions in the surroundings of the vehicle. An image located excessively far downward in the field of vision of the observer could result in an overlap with a reflection of a motor vehicle component, for example, a reflection of the dashboard. Therefore, a change of +/−2° is typically sufficient to adapt the location of the virtual image to the eyebox of the driver. The displacement range also has to be traveled through as "fluidly" as possible, so that an observer does not perceive the displacement, in particular adjustment. Furthermore, a high variability of various locations of the virtual image is thus implemented. Positioning motors having a strong step-down gearing are known for this purpose from the prior art, by means of which the adjustment, in particular the pivoting of the deflection mirror, is carried out. These positioning motors having the strong step-down gearing are often very costly and generate noise, which can be perceived to be annoying by an observer.

In these head-up display devices, there are embodiments in which the virtual image is projected on the inner side of the windscreen, so that it can be observed by the observer, in particular the driver, on the inner side. Furthermore, embodiments of head-up display devices different therefrom are known, in which the virtual image is not projected onto the windscreen, but rather is projected toward the observer using an additional mirror, the above-mentioned combiner mirror, of the head-up display device, and therefore in particular with correct setting of the combiner mirror, is projected into his face.

It is an object of the present invention to find a solution for how the pivoting of the mirror about the axis of rotation can take place in the simplest and nonetheless most reliable manner possible.

This object is achieved according to the invention by a display device, by a driver assistance system, by a motor vehicle, and also a method having the features according to the respective independent claims.

A display device according to the invention for a motor vehicle comprises a housing. Furthermore, a projection device for generating a virtual image is arranged in the housing. Furthermore, the virtual image is projected onto a projection surface located outside the housing and observable by an observer. It is provided that the projection device comprises a mirror mounted such that it is pivotable about an axis of rotation. Furthermore, the mirror is designed to deflect light output by the light source of the projection device in a deflection position. Furthermore, the display device comprises an adjustment device for adjusting the deflection position of the mirror by pivoting about the axis of rotation.

The adjustment device comprises at least one first shape-memory wire, which is coupled to the mirror, such that the mirror is pivotable about the axis of rotation by a length change of the shape-memory wire. The shape-memory wire can be formed, for example, from a shape-memory alloy, for example nickel-titanium, nickel-titanium copper, copper-zinc, or further shape-memory alloys. The shape-memory material preferably deforms in dependence on the intrinsic temperature within a certain temperature interval, i.e., in the event of temperature changes below a certain lower temperature, no phase-transition-related deformation takes place and from temperatures above a certain upper temperature, phase-transition-related shape change likewise no longer takes place. Shape-memory alloys are particular metals or metal alloys which can exist in two different crystal structures. While most metals have the same crystal structure up to the melting point thereof, shape-memory alloys have two different structures (phases) in dependence on the temperature. The shape conversion or shape change is thus based on the phase transition, i.e., the temperature-dependent lattice conversion, to one of these two crystal structures. Such a phase-transition-related shape change, for example an expansion, exceeds in this case the conventional, non-phase-transition-related thermal expansion of materials by orders of magnitude, i.e., by a factor of multiple powers of ten. Such a temperature change can be implemented in particular by means of energizing the shape-memory wire. Electrical energy is transformed into thermal energy by the electrical resistance of the wire, which can in turn result in the desired length change. It is provided according to the invention that in particular shape-memory alloys which comprise a length change as a shape change are arranged in the adjustment device. Such a shape-memory wire may be provided in a simple manner and results in pivoting of the mirror with minimal noise development.

An expanded reality with uniform elevation of the virtual image during the adaptation of a field of vision to user-specific requirements is enabled by the display device according to the invention. The depiction of the expanded reality is thus improved above all for, for example, very tall or very short users.

To determine the viewpoint, the display device can comprise a sensor device for detecting the viewpoint, and a control device, which is configured to control the adjustment device, in particular the first shape-memory wire, in dependence on a signal of the sensor device and thus carry out a pivot of the mirror. In other words, the control device can be configured to change a rotational position of the mirror in dependence on the signal of the sensor device. The sensor device can be a component or a device component of the display device in this case, which can comprise a corresponding sensor. Such a sensor can be designed, for example, as a camera.

In one advantageous embodiment, the adjustment device can comprise a separate coupling element which is coupled to the first shape-memory wire and the mirror such that by means of the length change of the first shape-memory wire a movement, in particular a linear movement, of the coupling element can be effectuated and thus a pivot of the mirror about the axis of rotation can occur to displace the deflection position. It is advantageous in this case that the shape-memory wire is not directly coupled to the mirror, and therefore a simpler installation of the first shape-memory wire can be implemented. Furthermore, in the event of a required replacement of one of the components, the components can be replaced individually, which results in a cost reduction and material savings.

In a further advantageous embodiment, the coupling element itself can be formed as variable in length observed in the direction of its longitudinal axis. By means of this arrangement, it is possible to damp undesired shaking movements, which can be transmitted via the coupling element, so that the shaking movements can be transmitted in a damped manner to the mirror. Furthermore, a still-finer adjustment can thus be implemented, since two length-variable components independent of one another can participate in the adjustment procedure.

It has proven to be advantageous for the coupling element to be formed as a spring element. The spring element is length-variable as such. A very exact spring force accurate to the demand can be provided by special materials and "wire thicknesses" of the spring as such. This spring force can be arranged in a damping and holding manner on the coupling element. A damping of the shaking movements and a damping of a force transmission from the first shape-memory wire to the mirror can be carried out in a simple and cost-effective manner by the spring element. Furthermore, the spring element can effectuate a restoring force on the mirror, such that the latter can be held in one position by means of the spring element.

It has also proven to be advantageous if the coupling element is formed as a second shape-memory wire. By means of the second shape-memory wire, a still more accurate adjustment of the mirror can be carried out, since the first shape-memory wire and the second shape-memory wire can be activated differently, and therefore, for example, the advantages of different shape-memory alloys can be utilized in combined form. Furthermore, the second shape-memory wire can effectuate a restoring force on the mirror, such that the latter can be held in one position by means of the second shape-memory wire.

According to one preferred embodiment, the coupling element can be connected to the first shape-memory wire by a separate connecting element. The connecting element can ensure, for example by way of an oblong shape, in particular a cylindrical shape, that a connection can be implemented between the coupling element and the first shape-memory wire. Furthermore, in the event of a required replacement, for example because of wear of one of the components, this can be implemented very easily since the movable components, in particular the coupling element and the first shape-memory wire, are decoupled from one another and are thus more easily replaceable.

In a further advantageous embodiment, the coupling element can be coupled to the mirror outside a reflection area of the mirror. The reflection area of the mirror can thus be utilized as a whole, whereby a more advantageous virtual image can be projected on the windscreen. The display device can thus also be produced in a more material-saving and cost-effective manner, since in particular the mirror is complex to produce. The entire available mirror area is therefore advantageously usable as a reflection area.

In a further embodiment, a coupling point between the coupling element and the mirror is formed not lying on the axis of rotation. In particular, the axis of rotation can be formed extending spaced apart from a first edge and spaced apart from a second opposing edge of the mirror. The axis of rotation can furthermore extend between further edges connecting the two edges, wherein the coupling point between the mirror and the coupling element is arranged in a connecting line between the edges between axis of rotation and an edge, in particular is formed on an edge. A lever arm can be generated by this arrangement, whereby the mirror can be adjusted with little application of force and high accuracy at the same time.

In a further advantageous embodiment, the adjustment device can comprise holding elements on which the shape-memory wire is fastened, wherein the holding elements are arranged on a circuit board. The holding elements can be used in this case as electrical contacts for the energizing of the first shape-memory wire. The adjustment device can be implemented to save installation space by the attachment of the holding elements on the circuit board. Furthermore, required switching elements, which can be used to control the adjustment device, can be arranged on the already provided circuit board. The first shape-memory wire can be held in a mechanically pre-tensioned position by the holding elements, such that the first shape-memory wire is only minimally impaired in its position by gravity. The activation or the length change of the first shape-memory wire can thus be implemented directly in the desired direction, namely in the longitudinal direction of the coupling element. A pivot about the axis of rotation can thus take place, which preferably extends in a vehicle transverse direction in the case of an installed display device. The holding elements can be formed as pins.

According to a further advantageous embodiment, the adjustment device can have a locking device, using which the mirror can be locked in its adjusted deflection position. By way of this arrangement, the mirror can be locked in the deflection position after an adjustment, and therefore after the adjustment in particular the first shape-memory wire can be returned back into an original position, which corresponds to a position which the first shape-memory wire has when it is not energized, without the mirror changing its position. This can have the result that both electrical energy can be saved and also wear of the first shape-memory wire can be reduced.

It has also proven to be advantageous if the locking device comprises a clutch engaging on the axis of rotation, by which the mirror is lockable in a set deflection position. By means of this arrangement, locking of the mirror in a set deflection position in a manner which saves installation space and components is possible.

According to a further preferred embodiment, the adjustment device is designed such that the mirror is changeable in its deflection position by less than +/−1.8° around a base position. It has particularly advantageously been shown that an eyebox of +/−2° can be implemented by means of a deflection position by less than +/−1.8° around a base position of the preferred adjustment range. In the event of a change in the deflection position, a location of the virtual image is thus changed, and therefore a displayed item of information is changed in the case of a virtual display, so that, for example in the case of the depiction of a navigation arrow, the latter is no longer located on the road from the view of the observer. Furthermore, the virtual image cannot move excessively far into a middle field of vision of the driver, since otherwise the virtual image could mask out possible obstructions in the surroundings of the vehicle. An image located excessively far down in the field of vision of the observer could result in an overlap with a reflection of a vehicle component, for example a reflection of the dashboard.

A driver assistance system according to the invention for a motor vehicle comprises a display device according to the invention.

A motor vehicle according to the invention comprises a driver assistance system according to the invention. The motor vehicle is designed in particular as a passenger vehicle.

A method according to the invention is used for adjusting a mirror of a display device of a motor vehicle. For this purpose, the display device comprises a housing which comprises a projection device arranged in the housing for generating a virtual image on a projection surface which is located outside the housing and is observable by an observer, and having at least one mirror mounted such that it is pivotable about an axis of rotation, which mirror is designed to deflect light output by a light source of the projection device in a deflection position, and having an adjustment device for adjusting the deflection position of the mirror by pivoting about the axis of rotation. The mirror is coupled to a first shape-memory wire of the adjustment device. A deflection position of the mirror is set by pivoting the mirror about the axis of rotation by way of a length change of the first shape-memory wire.

The control device can receive a corresponding control signal which describes a desired deflection and thus a desired vertical offset of a field of vision around the viewpoint of the observer and can effectuate a pivot of the mirror for the adjustment about the axis of rotation in dependence on the control signal. The control signal can be generated, for example, by an operating device of the motor vehicle or by the sensor device. An automatic adaptation of the eyebox can be implemented by means of the sensor device.

The preferred embodiments presented with respect to the display device according to the invention and the advantages thereof apply, mutatis mutandis, to the driver assistance system according to the invention, the motor vehicle according to the invention, and the method according to the invention.

Further features of the invention result from the claims, the figures, and the description of the figures. The features and feature combinations mentioned above in the description, and also the features and feature combinations mentioned hereafter in the description of the figures and/or shown solely in the figures are usable not only in the particular specified combination, but also in other combinations or alone, without departing from the scope of the invention. Therefore, embodiments of the invention are also to be considered to be comprised and disclosed which are not explicitly shown and explained in the figures, but originate and can be produced by way of separate feature combinations from the explained embodiments. Embodiments and feature combinations are therefore also to be considered to be disclosed which do not have all the features of an originally formulated independent claim.

The invention will be explained only on the basis of exemplary embodiments and with reference to the appended drawings, in which.

In the figures, identical and functionally identical elements are provided with the same reference signs.

Figure 1:
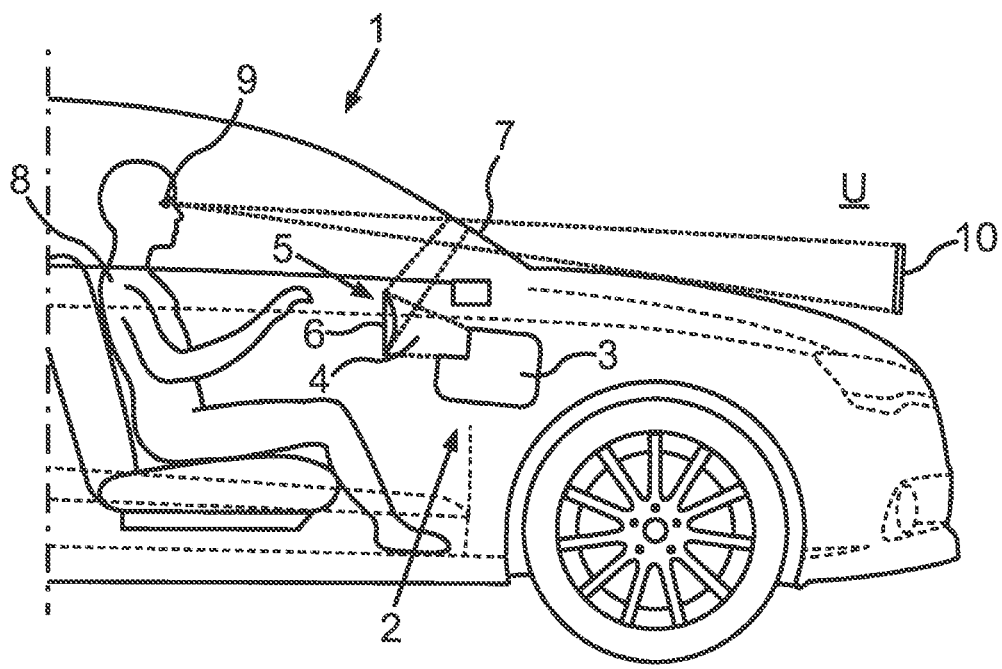
FIG. 1 shows a partial illustration of a motor vehicle which comprises a display device according to one embodiment of the present invention.

FIG. 1 shows a partial illustration of a motor vehicle 1 according to one embodiment of the present invention. The motor vehicle 1 is designed in the present exemplary embodiment as a passenger vehicle. The motor vehicle 1 generally comprises a display device 2 for projection of a virtual image 10 on a device-external projection surface. The display device 2 is designed in the present exemplary embodiment as a head-up display. The display device 2 can be arranged in particular on an instrument cluster shroud of the motor vehicle 1, which can in turn be arranged on a dashboard.

The display device 2 comprises a projection device 3. In particular light 4 can be emitted by means of the projection device 3. In particular, an image can be provided using the projection device 3. The projection device 3 can comprise, for example, a corresponding display screen, using which light 4 initially from a light source of the projection device 3 is processed to generate the virtual image 10 and then an image can be provided. In addition, the display device 2 comprises an optical device 5. In the present case, the optical device 5 comprises a mirror 6. The light 4 emitted by the projection device 3 in the form of the virtual image 10 is firstly incident on the mirror 6 and subsequently on a display element or on a device-external projection surface, which in particular represents a windscreen 7 of the motor vehicle 1. The projection device 3 and the optical device 5 are arranged in the present case inside a dashboard of the motor vehicle 1.

The windscreen 7 comprises a mirror surface and is formed semi-transparent. The light 4 emitted by the projection device 3 is projected by means of the optical device 5 onto the windscreen 7. Furthermore, the light 4 which is projected onto the windscreen 7 is reflected to the eyes 9 of an observer, in particular a driver 8, of the motor vehicle 1. Therefore, this display having the light which reaches the eyes 9 of the observer from a surroundings region U of the motor vehicle 1 is overlaid with the light 4 which is projected onto the windscreen 7. A virtual display or a virtual image 10 thus results for the observer, who is in particular the driver 8 of the motor vehicle 1.

The virtual image 10 can in particular be projected onto the windscreen 7 such that it is displayed in a lower field of vision of the driver 8. The position is preferably located in a lower field of vision of the driver 8 where no reflection of other vehicle components, for example a reflection of a dashboard, occurs for the driver 8. The virtual image 10 is furthermore preferably located in a field of vision, such that all obstructions, in particular of a road, are still recognizable by the driver 8.

Figure 2:
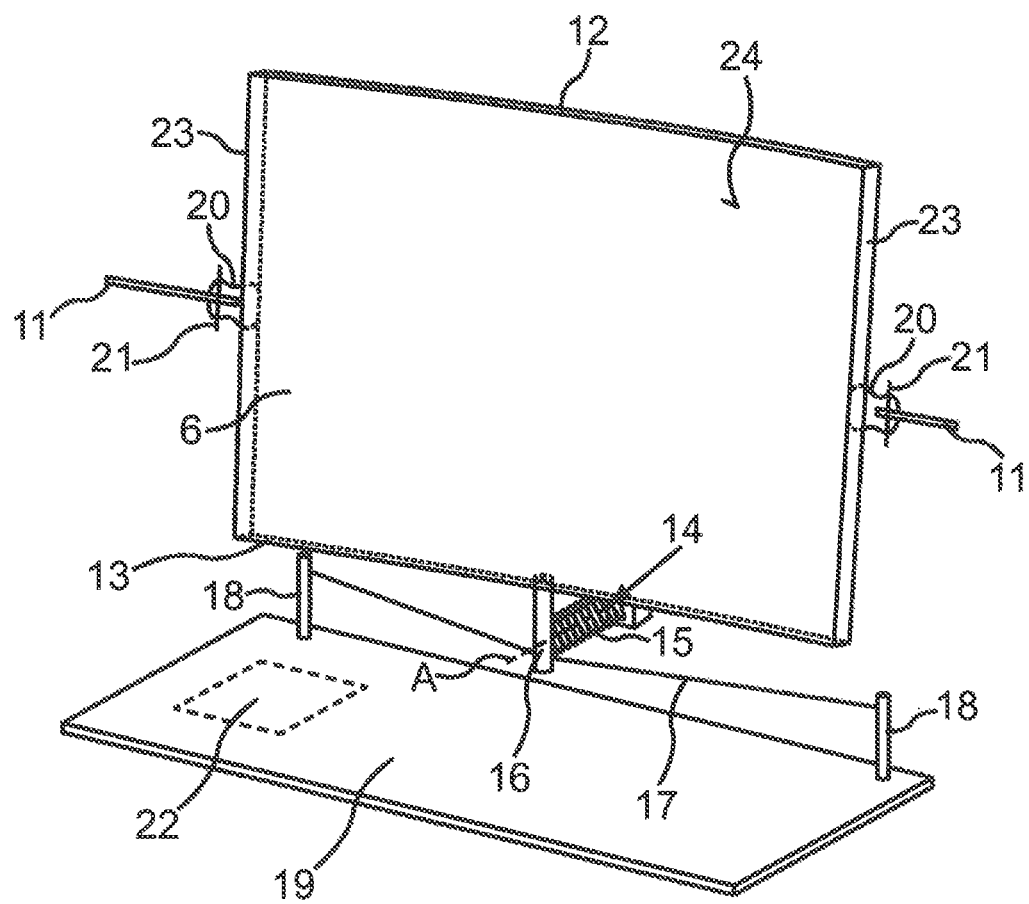
FIG. 2 shows a schematic and partial illustration of the display device having a pivotable mirror.

FIG. 2 partially and schematically shows the display device 2 in a perspective view. The mirror 6 of the projection device 3 is in particular mounted such that it is pivotable about an axis of rotation 11 in this case. The axis of rotation 11 of the mirror 6 extends spaced apart from an upper edge 12 and a lower edge 13, in particular parallel to the upper edge 12 and/or the lower edge 13. A coupling point 14, which is in particular formed outside a reflection area 24 of the mirror 6, is advantageously arranged at the lower edge 13. The mirror 6 is connected to a coupling element 15 via the coupling point 14. The coupling element 15 is designed, for example, as a spring element, which is therefore length-variable as such in the direction of its longitudinal axis A. However, further embodiments are also possible, in particular a further embodiment as a second shape-memory wire is possible, which is also accordingly length-variable as such. The coupling element 15, which is connected at a first end to the coupling point 14, is connected at a second point to a connecting element 16. The connecting element 16 can be formed in particular cylindrical here, whereby a larger connecting surface can be implemented, and therefore a first shape-memory wire 17 can make contact with the connecting element 16, but it nonetheless has degrees of movement freedom.

The first shape-memory wire 17 is positioned in the embodiment such that, in the shortened position, it extends at least largely in parallel to the axis of rotation 11 of the mirror 6. The first shape-memory wire 17 is arranged on two pin-like holding elements 18, which are used for holding and pre-tensioning the first shape-memory wire 17, on the one hand, but are also connected to a circuit board 19 and are electrically conductive, on the other hand. Respective locking devices 20 are arranged on the further edges 23 of the mirror 6, which are designed for locking the mirror 6 in a deflection position. The mirror 6 itself is held by means of a holder 21 on a housing (not shown in this figure) of the display device 2. The holder 21 is arranged in this exemplary embodiment on the axis of rotation 11 of the mirror 6.

A control device 22 on the circuit board 19 is used for activating, in particular for energizing the first shape-memory wire 17. The holding elements 18 can be electrically activated in this case by the control device 22, whereby the first shape-memory wire 17 can execute a length change. If a shortening of the first shape-memory wire 17 takes place, for example from the position shown here of the first shape-memory wire 17, a force is thus transmitted to the connecting element 16, which in turn relays the force to the coupling element 15. The coupling element 15 is designed in this case as a spring element, and can transmit the force in a damped manner by means of the coupling point 14 to the lower edge 13 of the mirror 6. A lever arm resulting between the axis of rotation 11 and the lower edge 13 results in a rotational movement about the axis of rotation 11 of the mirror 6 from a linear force, which is transmitted by the coupling element 15.

An optional sensor device in the motor vehicle 1 can determine, for example, an eye height or a viewpoint of an observer, in particular of the driver 8. For example, the sensor device can be embodied as a camera, which can be arranged on a roof lining or on an inner mirror of the motor vehicle 1 arranged on the windscreen 7, and can be configured to detect a spatial location of an eye 9 of the driver 8. The sensor signal can be transmitted to the control device 22 via a wireless or wired data communication device.

The control device 22 can then activate the first shape-memory wire 17 in dependence on the sensor signal, i.e., in dependence on the location of the eye 9, and thus pivot the mirror 6 into a preferred position. Additionally or alternatively, the control device 22 can receive a control signal from an operating device, which signal describes a desired vertical offset of the field of vision around the viewpoint of the driver 8. For this purpose, the driver 8 can input a displacement of the field of vision, for example with the aid of the operating device of an instrument cluster or an infotainment system.

The pivoting of the mirror 6 can take place around the axis of rotation 11, which can preferably extend in a motor vehicle transverse direction in the case of an installed display device 2. In this exemplary embodiment, the axis of rotation 11 extends perpendicularly to a plane of the figure. Due to the pivotable mounting of the mirror 6 inside the housing (not shown), a mirror plane for the virtual image 10 is displaced linearly upon a change in the mirror position, without the virtual image 10 significantly changing its location on the projection surface, in particular the windscreen 7. A displacement of the eyebox can be achieved by the linear shift of the mirror plane. The virtual image 10 can thus be kept at the same height with respect to the road.

Due to this pivot movement of the mirror 6 (between +/−1.8°), the virtual image 10 can be shifted by +/−2° on the windscreen 7, whereby an adaptation of the eyebox to the observer, in particular the driver 8, can be implemented.

Figure 3:
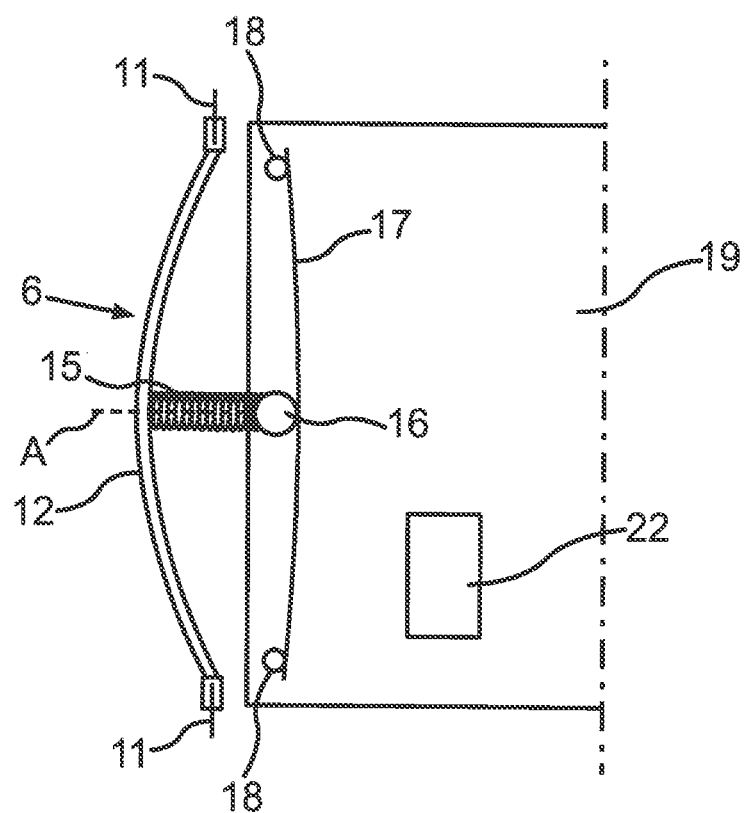
FIG. 3 shows a partial and schematic top view of the display device.

FIG. 3 shows a partial and perspective simplified view of the embodiment of the display device 2 already illustrated in FIG. 2. The mirror 6 is located in this case in a deflection position, which can be implemented by means of a length change of the first shape-memory wire 17. The first shape-memory wire 17 is arranged in this case using a connecting element 16 on a coupling element 15, whereby a length change of the first shape-memory wire 17 results in a linear movement of the coupling element 15. The coupling element 15 is formed here as a spring element, whereby forces acting in a damped manner on the coupling element 15 can be transmitted in a damped manner to the mirror 6, which is connected via the coupling point 14 to the coupling element 15. A linear force transmission of the coupling element 15 acts in this case like a lever arm and causes a pivot of the mirror 6. Due to the pivotable mounting of the mirror 6 within a housing (not shown), a mirror plane for the virtual image 10 is linearly shifted upon a change in the position of the mirror 6, without the virtual image 10 significantly changing in its location on the windscreen 7, but in accordance with the desired setting.

The invention claimed is:

1. A display device for a motor vehicle comprising:
    a housing which comprises a projection device arranged in the housing for generating a virtual image on a projection surface located outside the housing and observable by an observer,
    wherein the projection device comprises at least one mirror mounted such that the mirror is pivotable about an axis of rotation,
    wherein the mirror deflects light output by a light source of the projection device in a deflection position, the projection device further comprising an adjustment device for adjusting the deflection position of the mirror by pivoting about the axis of rotation,
    wherein the adjustment device comprises:
        at least one first shape-memory wire, which is coupled to the mirror, such that the mirror is pivotable about the axis of rotation by a length change of the first shape-memory wire, and
        a separate coupling element, which is coupled to the first shape-memory wire and the mirror, such that a linear movement of the coupling element is effectuated by the length change of the first shape-memory wire and a pivot of the mirror about the axis of rotation occurs to displace the deflection position.

2. The display device according to claim 1, wherein the coupling element is formed as length-variable as such viewed in a direction of its longitudinal axis.

3. The display device according to claim 2, wherein the coupling element is formed as a spring element.

4. The display device according to claim 2, wherein the coupling element is formed as a second shape-memory wire.

5. The display device according to claim 1, wherein the coupling element is connected to the first shape-memory wire by a separate connecting element.

6. The display device according to claim 1, wherein the coupling element is coupled to the mirror outside a reflection area of the mirror.

7. The display device according to claim 1, wherein a coupling point between the coupling element and the mirror is formed not lying on the axis of rotation.

8. The display device according to claim 1, wherein the adjustment device comprises holding elements on which the first shape-memory wire is fastened, wherein the holding elements are arranged on a circuit board.

9. The display device according to claim 1, wherein the adjustment device comprises a locking device, using which the mirror is lockable in its adjusted deflection position.

10. The display device according to claim 9, wherein the locking device comprises a clutch engaging on the axis of rotation, by which the mirror is lockable in a set deflection position.

11. The display device according to claim 1, wherein the adjustment device is designed such that the mirror is changeable in its deflection position by less than ±1.8° around a base position.

12. A driver assistance system comprising the display device according to claim 1.

13. A motor vehicle comprising the driver assistance system according to claim 12.

14. A method for adjusting a mirror of a display device of a motor vehicle, the method comprising:
    forming the display device having a housing which comprises a projection device arranged in the housing for generating a virtual image on a projection surface located outside the housing and observable by an observer, the projection device comprising:
        at least one mirror mounted such that the mirror is pivotable about an axis of rotation, wherein the mirror is formed to deflect light output by a light source of the projection device in a deflection position, and
        an adjustment device for adjusting the deflection position of the mirror by pivoting about the axis of rotation;
    coupling the mirror to a first shape-memory wire of the adjustment device; and
    setting the deflection position of the mirror by pivoting of the mirror about the axis of rotation by way of a length change of the first shape-memory wire,
    wherein the adjustment device comprises a separate coupling element, which is coupled to the first shape-memory wire and the mirror, such that a linear movement of the coupling element is effectuated by the length change of the first shape-memory wire and a pivot of the mirror about the axis of rotation occurs to displace the deflection position.

* * * * *